United States Patent
Tanaka et al.

(10) Patent No.: US 6,402,267 B2
(45) Date of Patent: Jun. 11, 2002

(54) BRAKING CONTROL APPARATUS FOR VEHICLES

(75) Inventors: Wataru Tanaka, Anjo; Toshiaki Hamada, Okazaki; Hirofumi Nitta, Obu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/802,967

(22) Filed: Mar. 12, 2001

(30) Foreign Application Priority Data

Mar. 22, 2000 (JP) ........................................ 2000-080851

(51) Int. Cl.[7] ................................................ B60T 8/00
(52) U.S. Cl. ..................................... 303/155; 303/114.1
(58) Field of Search ............................. 303/10, 122.09, 303/113.1, 133.2, 113.4, 113.5, 155; 701/29, 31, 70

(56) References Cited

U.S. PATENT DOCUMENTS

| | | | | |
|---|---|---|---|---|
| 5,954,406 A | * | 9/1999 | Sawada | 33/122.09 |
| 6,120,110 A | * | 9/2000 | Shimizu | 303/113.4 |
| 6,192,308 B1 | * | 2/2001 | Onuma | 701/70 |
| 6,276,763 B1 | * | 8/2001 | Isono et al. | 303/114.1 |
| 6,328,389 B1 | * | 12/2001 | Yotsuya et al. | 303/113.3 |

FOREIGN PATENT DOCUMENTS

DE 197 03 776 8/1998

* cited by examiner

Primary Examiner—Christopher P. Schwartz
(74) Attorney, Agent, or Firm—Burns, Doane, Swecker & Mathis, LLP (57) ABSTRACT

A vehicle braking control apparatus carries out a pressure apply check to determine if the automatic pressure apply is calculated normally when the vehicle is started. The apparatus includes a fluid pressure generator that generates a master cylinder pressure in response to a pedal depression force, a fluid supplying device that supplies a braking fluid pressure to the wheel cylinders from the master cylinder, and a pressure apply device that introduces the fluid pressure to the pressure chamber of the fluid pressure generator. A controller controls the braking force of each wheel by driving the fluid pressure supplying device and controls pressurization of the master cylinder pressure by automatically controlling the pressure apply device. A pressure apply check device starts a pressure apply check to determine that the automatic pressure apply is calculated normally when the master cylinder pressure is increased up to a fixed value within a fixed time after the pressure apply check is started.

18 Claims, 4 Drawing Sheets

BRAKING CONTROL APPARATUS FOR VEHICLES

This application is based on and claims priority under 35 U.S.C. § 119 with respect to Japanese Application No. 2000-080851 filed on Mar. 22, 2000, the entire content of which is incorporated herein by reference.

FIELD OF THE INVENTION

This invention generally relates to vehicle braking systems. More particularly, the present invention pertains to a braking control apparatus for vehicles which is adapted to generate a master cylinder pressure in response to a pedal depression force and to automatically increase the master cylinder pressure through operation of a booster.

BACKGROUND OF THE INVENTION

One known braking control apparatus is disclosed in German Patent Offenlegungsschrift No. 197 03 776 A1. This braking control apparatus includes a fluid pressure generating device for generating a master cylinder pressure in response to a pedal depression force and a pressurizing device for introducing fluid pressure to a pressure chamber of the fluid pressure generating device in order to obtain a boosted force for the pedal depression force by automatically increasing the master cylinder pressure by the pressurizing device.

With this known braking control apparatus, it is necessary to check the automatic pressure increasing function to assess whether it is correctly calculated before starting the vehicle so that the increased pressure is always assured without giving any undesired feeling to the driver of the vehicle.

A need thus exists for a vehicle braking control apparatus that is able to readily and reliably check the automatic pressure increase function and assess whether it is calculated correctly when the vehicle starts.

SUMMARY OF THE INVENTION

A braking control apparatus for a vehicle includes a fluid pressure generator that generates a master cylinder pressure in a master cylinder in response to a pedal depression force, a fluid supplying device that supplies braking fluid pressure to wheel cylinders of each wheel of the vehicle from the master cylinder, a pressure apply device that introduces fluid pressure to the pressure chamber of the fluid pressure generator, and a controller that automatically increases the master cylinder pressure by controlling the pressure apply device and for controlling the braking force of each wheel by driving the fluid supplying device. The controller includes a pressure apply check device for starting pressure apply check when the vehicle is started to determine whether the automatic pressure increase function is properly performed. The pressure apply check device judges that the proper automatic pressure increase is made when the master cylinder pressure is increased to a predetermined value within a predetermined time after the pressure apply check starts.

According to the present invention, the pressure apply check is performed when the vehicle is started because the pressure apply check is started in synchronization with the starting of the vehicle. Additionally, in the pressure apply check device, the automatic pressure apply is judged normal when the master cylinder pressure is increased up to the fixed value. The pressure apply check device is able to detect an abnormality of the automatic pressure apply caused by a failure in the pressure apply device when the master cylinder pressure is not increased up to the fixed value.

The braking control apparatus also includes a brake pedal depression force device that outputs a first signal when the brake pedal is depressed and outputs a second signal when the brake pedal is released. The pressure apply check device starts the pressure apply check when the second signal is outputted after an initial first signal has been outputted after the engine is started. The pressure apply check device holds the brake fluid pressure of the wheel cylinders of each wheel by maintaining the fluid supply device in a holding condition and starts automatic pressure increase operation by controlling the pressure apply device at the start of the pressure apply check.

Thus, the increasing of the master cylinder pressure by the automatic pressure apply is not transmitted to the wheel cylinders and the pressure apply check can be practiced without disturbing the vehicle start because the brake fluid of the wheel cylinders of all the wheels is assured when the pressure apply check is started.

The pressure apply check device ends the pressure apply check when the first signal is outputted during the pressure apply check. Thus, when the applied check is practiced after the vehicle actually starts, if the brake pedal is depressed by the deceleration demand of the driver, the pressure apply check is ended and the deceleration demand is performed.

The pressure apply check means ends the pressure apply check when the changing speed of the master cylinder pressure becomes zero during the pressure apply check, A learning process correction of a pre-set pressure modulating characteristic of the pressure apply device is then performed based on the control current value to the linear valve and the master cylinder pressure. Because the correction of the pressure control or modulating characteristic is performed based on the stable master cylinder pressure when the master cylinder pressure is increased and the pressure changing speed becomes zero and based on the control current value to the linear valve, the subsequent automatic pressure apply control carried out more correctly.

According to another aspect of the invention, a braking control apparatus for a vehicle includes a master cylinder generating a brake fluid pressure in response to a brake pedal depression force, with the master cylinder including a pressure chamber connected to at least one wheel cylinder associated with one of the wheels, a fluid pressure sensor detecting the master cylinder pressure in the pressure chamber, a pressure apply unit performing pressure apply by introducing fluid pressure to the pressure chamber of the master cylinder, a controller automatically increasing the brake fluid pressure by controlling the pressure apply unit, and a pressure apply check device for starting a pressure apply check when the vehicle is started to determine whether the pressure apply is abnormal. The he pressure apply check device determines that the pressure apply is abnormal when the master cylinder pressure determined by the fluid pressure sensor fails to reach a predetermined value within a predetermined time.

Another aspect of the invention involves a method for determining proper automatic pressure increase in a braking control apparatus for a vehicle that includes an engine, a brake pedal, wheels, a master cylinder that generates a master cylinder pressure in response to depression of the brake pedal, and a pressure apply unit for introducing fluid pressure into a pressure chamber of the master cylinder to effect automatic pressure increase. The method includes initiating a pressure apply check upon starting the vehicle to determine that the automatic pressure increase is proper, measuring the master cylinder pressure after initiation of the pressure apply check, and determining that the automatic pressure increase is proper when the master cylinder pressure has reached a predetermined value within a predetermined time after initiation of the pressure apply check.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
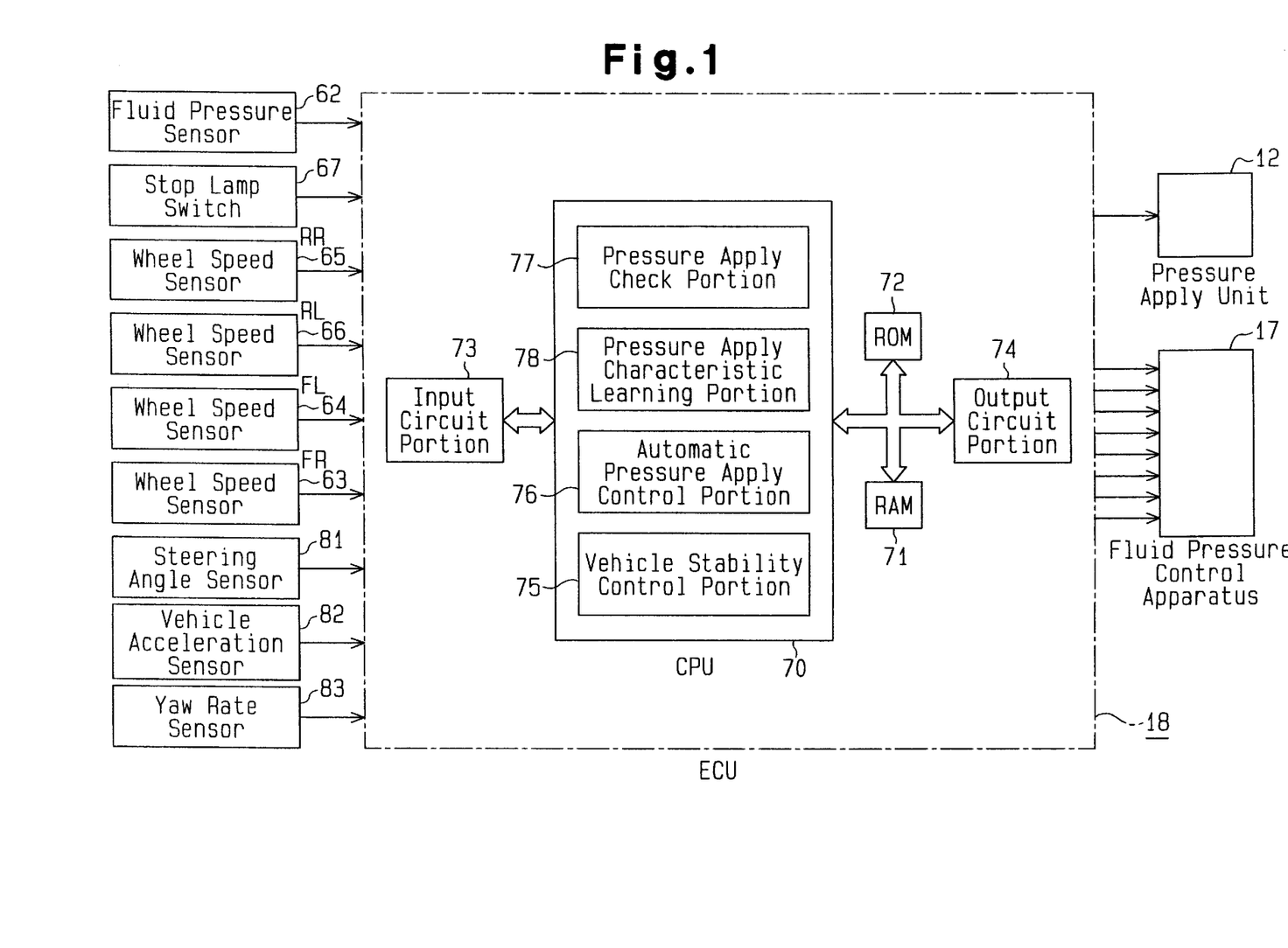
FIG. 1 is a block diagram of the electronic control unit used in the vehicle brake control apparatus of the present invention.
Figure 2:
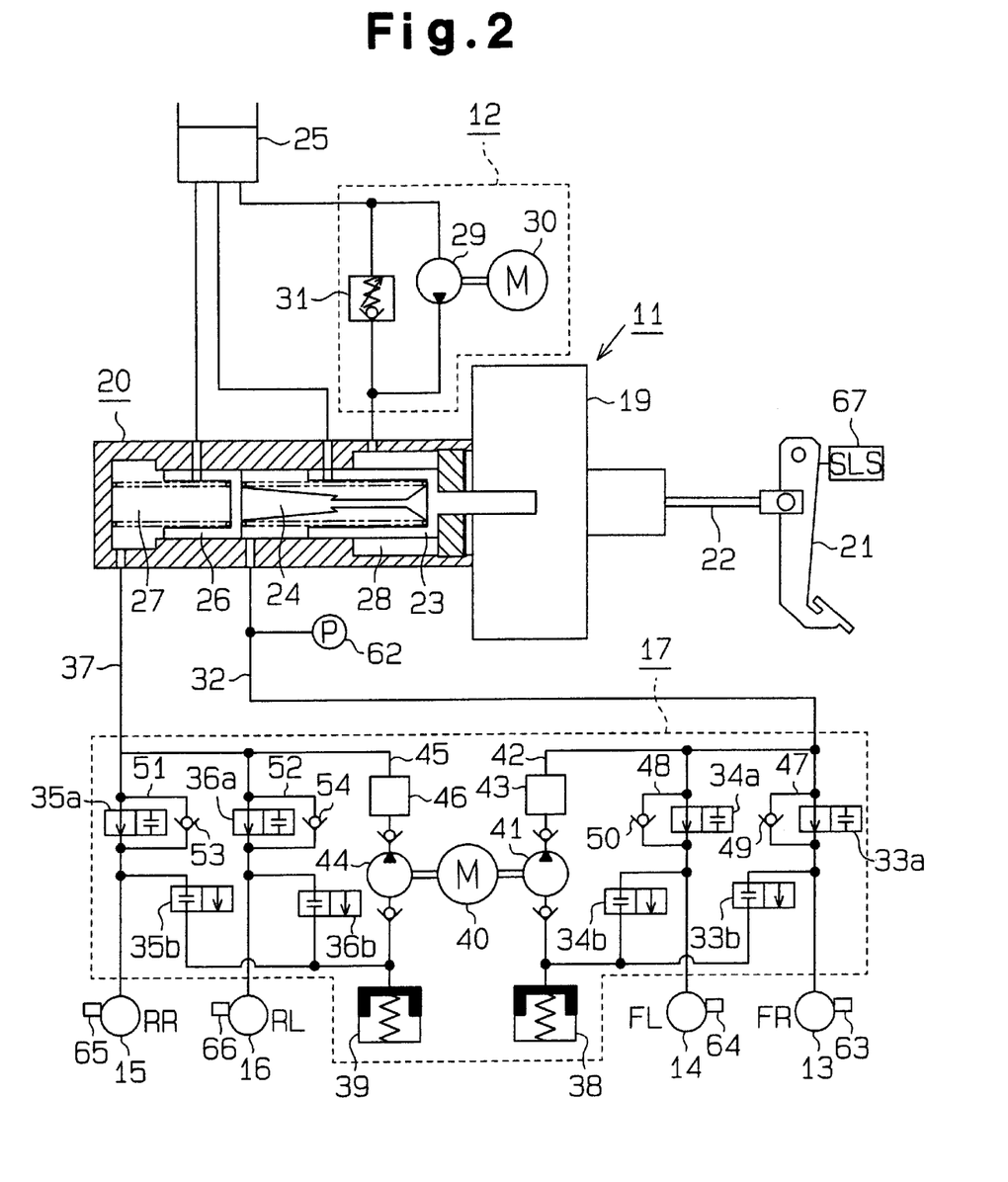
FIG. 2 is a schematic illustration of the overall braking control apparatus of the present invention.

Referring initially to FIG. 2, the vehicle braking control apparatus which performs an automatic pressure applying function in accordance with the present invention includes a fluid pressure generating apparatus 11 that generates brake fluid pressure and a pressure apply unit 12 functioning as a pressure applying means for introducing fluid pressure for automatic pressure application to the apparatus. In addition, the braking control apparatus is provided with a fluid pressure control apparatus 17 for supplying the brake fluid pressure to the wheel cylinders 13, 14, 15, 16 and an electric control unit 18 (shown in FIG. 1) for controlling the braking force applied at each wheel. The wheel cylinders 13, 14, 15, 16 are respectively installed at the front right wheel, the front left wheel, the rear right wheel, and the rear left wheel of the vehicle.

The fluid pressure generating apparatus 11 is provided with a vacuum booster 19 and a master cylinder 20. A first piston 23 and a second piston 26 are disposed within the master cylinder 20. To simplify the overall structure and the illustrated features of the master cylinder 20, various known features associated with the master cylinder 20 such as the seal members are omitted.

In the fluid pressure generating apparatus 11, a pedal depression force of a brake pedal 21, amplified by the lever ratio of the associated link mechanism, is transmitted to an operating rod 22 so that the operating rod 22 is pushed by the pedal depression force. The pushing force received by the rod 22 is amplified by the vacuum booster 19 and pushes the first piston 23 of the master cylinder 20. When the first piston 23 moves in opposition to the urging force of a spring from the position shown in FIG. 2, communication between a first pressure chamber 24 of the master cylinder 20 and a reservoir 25 is cut off, and fluid pressure is generated in the first pressure chamber 24. When the second piston 26 is pushed against the urging force of a spring from the position shown in FIG. 2 by the fluid pressure, communication between a second pressure chamber 27 and the reservoir 25 is cut off and fluid pressure is generated in the second pressure chamber 27.

Accordingly, when the first piston 23 is pushed by the pedal depression force amplified by the link mechanism and the vacuum booster 19, a brake pressure is generated corresponding to the pedal input pressure Pmcin and responsive to the pedal depression force in the first pressure chamber 24. In addition, when the second piston 26 is pushed by the brake fluid pressure in the first pressure chamber 24, a brake fluid pressure is generated in the second pressure chamber 27. It is to be recognized that pressure increase by vacuum booster includes pressure increase by the lever ratio of the link mechanism.

The master cylinder 20 is also provided with a third pressure chamber 28 which applies fluid pressure to the end surface of the first piston 23 at the booster side of the first piston 23. The fluid pressure generated in the pressure apply unit 12 is introduced into the third pressure chamber 28. The brake fluid pressure of the third chamber servo pressure Pmc3 is generated in the first pressure chamber 24 since the first piston 23 is pushed by the fluid pressure (the third chamber pressure P3). In this case the third chamber servo pressure Pmc3 is given by the third chamber pressure P3 corresponding to the ratio between the pressure receiving areas of the first piston 23 of the booster side and of the anti-booster side.

In this way, the master cylinder pressure Pmc generated by the master cylinder includes the pedal input pressure Pmcin component associated with the pedal depression force amplified by the vacuum booster 19 and the third chamber servo pressure Pmc3 component associated with the fluid pressure introduced by the pressure apply unit 12.

The pressure apply unit 12 includes a pump 29 that compresses or pressurizes brake fluid stored in the reservoir 25 and supplies the pressurized brake fluid to the third pressure chamber 28, a motor 30 that drives the pump 29, and a linear valve 31 that opens in response to the current value of an input signal (control signal) for introducing brake fluid discharged from the pump 29 into the reservoir 25. In accordance with the control signal (current value) outputted from the electric control unit (ECU) 18 to the linear valve 31, fluid pressure corresponding to the value of the control signal (the current value) is introduced into the third pressure chamber 28 based on the characteristic of the linear valve 31 between the fluid pressure (P3) and the current value.

The brake fluid pressure generated in the master cylinder 20 is supplied to each wheel cylinder, with the wheel cylinders being divided into a front wheel side that includes the two wheel cylinders 13, 14 associated with the front wheels FL, FR and a rear wheel side that includes the two wheel cylinders 15, 16 associated with the rear wheels RL, RR. Thus, the fluid pressure control apparatus 17 which connects the master cylinder 20 and the wheel cylinders 13–16 directs fluid pressure to the wheel cylinders 13, 14 on the front side of the vehicle and directs fluid pressure to the wheel cylinders 15, 16 on the rear side of the vehicle.

More specifically, the brake fluid pressure generated in the first pressure chamber 24 is introduced into a main passage 32. The main passage 32 is connected with the wheel cylinders 13, 14 through the front side system circuit portion of the fluid pressure control apparatus 17. The main passage 32 is connected with the wheel cylinder 13 through a holding valve 33a, while the main passage 32 is connected with the wheel cylinder 14 through a holding valve 34a. A passage extending between the wheel cylinder 13 and the holding valve 33a is connected with a reservoir 38 through a pressure reducing valve 33b and a passage extending between the wheel cylinder 14 and the holding valve 34a is connected with the reservoir 38 through a pressure reducing valve 34b.

On the other hand, the brake fluid pressure generated in the second pressure chamber 27 of the master cylinder 20 is introduced into the main passage 37. The main passage 37 is connected with the wheel cylinders 15, 16 through the rear side system circuit portion of the fluid pressure control apparatus 17. The main passage 37 is connected with the wheel cylinder 15 through a holding valve 35a, while the main passage 37 is connected with the wheel cylinder 16 through a holding valve 36a. A passage extending between the wheel cylinder 15 and the holding valve 35a is connected with a reservoir 39 through a pressure reducing valve 35b and a passage extending between the wheel cylinder 16 and the holding valve 36a is connected to the reservoir 39 through a pressure reducing valve 36b.

The holding valves 33a, 34a, 35a, 36a are normally open type solenoid valves, while the pressure reducing valves 33b, 34b, 35b, 36b are normally closed type solenoid valves. These solenoid valves are excited or energized by the fluid pressure control signal (control current) outputted from the ECU 18.

The function and operation of the holding valve 33a and the pressure reducing valve 33b associated with the front right side wheel is described below. It is to be understood that the function and operation of the other holding valves 34a, 35a, 36a and the other reducing valves 34b, 35b, 36b associated with the other three wheels are similar. When the holding valve 33a is not energized (i.e., the off condition) and the pressure reducing valve 33b is not energized (i.e., the off condition), a pressure increasing condition exists because the wheel cylinder 13 is in communication with the master cylinder 20 and is prevented from communicating with the reservoir 38. In this pressure increasing condition, the brake fluid pressure in the wheel cylinder 13 is increased.

When the holding valve 33a and the pressure reducing valve 33b are both energized (i.e., they are both in the on condition), a pressure decreasing condition exists because the wheel cylinder 13 is in communication with the reservoir 38 and is prevented from communicating with the master cylinder 20. In the pressure decreasing condition, the brake fluid pressure in the wheel cylinder 13 is decreased.

When the holding valve 33a is energized (i.e., the on condition) and the pressure reducing valve 33b is not energized (i.e., in the off condition), the pressure in the wheel cylinder is held because the wheel cylinder 13 is prevented from communicating with both the master cylinder 20 and the reservoir 38. In the pressure holding condition, the brake fluid pressure of the wheel cylinder 13 is maintained without being increased or decreased.

Through operation of the valves in the above-described manner, the braking force applied to each wheel is individually controlled by controlling the brake fluid pressure supplied to each wheel cylinder 13, 14, 15, 16 as a result of changing the fluid pressure control signal (i.e., on or off) outputted to the holding valves and the pressure reducing valves of each wheel from the ECU 18.

In the front side system circuit portion of the fluid pressure control apparatus 17, the brake fluid stored in the reservoir 38 is pumped by the motor driven pump 41 and discharged to the up stream passage of the holding valves 33a, 34a by way of two check valves located on opposite sides of the pump 41 and a damper 43, with the check valves and damper being provided in a pump passage 42.

In the same way, in the rear system circuit portion of the fluid pressure control apparatus 17, the brake fluid stored in the reservoir 39 is pumped by the motor driven pump 44 and discharged to the up stream passage of the holding valves 35a, 36a by way of two check valves located on opposite sides of the pump 44 and a damper 46, with the check valves and damper being provided in a pump passage 45.

In the front system circuit portion, return passages 47, 48 are provided for permitting the return of brake fluid from each wheel cylinder 13, 14 into the master cylinder 20 while bypassing the holding valves 33a, 34a. Respective inverse stop valves 49, 50 preventing the back flow of the brake fluid into the wheel cylinders are provided in each return passage 47, 48.

Likewise, in the rear system circuit portion, return passages 51, 52 are provided for permitting the return of brake fluid from each wheel cylinder 15, 16 into the master cylinder 20 while bypassing the holding valves 35a, 36a. Respective inverse stop valves 53, 54 preventing the back flow of the brake fluid into the wheel cylinders are provided in each return passage 51, 52.

A fluid pressure sensor 62 detecting the master cylinder pressure (Pmc) as a brake fluid pressure generated in the master cylinder 20 is provided in the main passage 32. Wheel speed sensors 63, 64, 65, 66 are operatively associated with each respective wheel FR, FL, RR, RL to detect the wheel speed of each wheel. A stop lamp switch (SLS) 67 operatively associated with the brake pedal 21 operates as a detecting sensor for detecting the depression of the brake pedal 21. The stop lamp switch (SLS) 67 outputs a first signal (e.g., an on signal) if the pedal 21 is depressed and outputs a second signal (e.g., an off signal) if the brake pedal is released is provided in the brake pedal 21.

The structure of the ECU shown in FIG. 1 is as follows. The current supplied to the linear valve 31 of the pressure apply unit 12 is controlled by the ECU 18 in response to the pedal depression force or the condition of the vehicle. The master cylinder pressure is pressurized automatically by changing the fluid pressure (the third chamber pressure P3) introduced into the third pressure chamber 28 of the master cylinder 20 by the pressure apply unit 12 and the braking force of each wheel is controlled by driving the fluid pressure control apparatus 17 under the control of the ECU 18.

The ECU 18 is an electric control unit mainly comprised of micro computers. More specifically, the ECU 18 is comprised of a CPU (central processing unit) 70, a RAM (random access memory) 71, a ROM (read only memory) 72, an input circuit portion 73 and an output circuit portion 74.

The fluid pressure sensor 62, the stop lamp switch 67, and the wheel speed sensors 63, 64, 65, 66 are connected to the input circuit portion 73. A steering angle sensor 81 detecting the steering angle, a vehicle acceleration sensor 82 detecting the acceleration in the longitudinal or the lateral direction of the vehicle, and a yaw rate sensor 83 detecting the yaw rate generated in the vehicle are also connected with the input circuit portion 73.

The motor 30 and the linear valve 31 of the pressure apply unit 12, and the holding valves 33a, 34a, 35a, 36a, the pressure reducing valves 33b, 34b, 35b, 36b and the motor 40 of the fluid pressure control apparatus 17 are connected to the output circuit portion 74.

The ECU is also provided with a vehicle stability control portion 75, an automatic pressure apply control portion 76, a pressure apply check portion 77 serving as a pressure apply check, a pressure apply characteristic learning portion 78, an anti-skid control portion 79, and a traction control portion 80. These portions are operated under the control of the CPU 70.

The vehicle stability control that controls the braking force of each wheel is operated or carried out by the vehicle stability control portion 75 based on the vehicle condition detected by the wheel speed sensors 63, 64, 65, 66, and the sensors 81, 82, 83 to reduce the difference between a target line or desired path of travel of the vehicle and the actual target line or path of travel of the vehicle (i.e., a detected vehicle condition) during steering or turning for instance. Accordingly, the operation of the motor 30 of the pressure apply unit 12 and the value (current value I) of the control signal outputted to the linear valve 31 are controlled by the vehicle stability control portion 75 in response to the vehicle condition detected. Additionally, the holding valves 33a, 34a, 35a, 36a, the pressure reducing valves 33b, 34b, 35b, 36b and the motor 40 of the fluid pressure control apparatus 17 are controlled by the vehicle stability control portion 75.

The automatic pressure apply control portion 76 controls the current of the linear valve 31 of the pressure apply unit 12 so that the master cylinder pressure is pressurized automatically to change the fluid pressure (the third chamber pressure P3) introduced into the third pressure chamber 28 by the pressure apply unit 12. Accordingly, in the automatic pressure apply control portion 76, for instance, the fluid pressure (the third chamber pressure P3) is changed and the master cylinder pressure Pmc is pressurized automatically by the third servo pressure Pmc3 in response to the fluid pressure by the master cylinder pressure Pmc when the amplified pressure limit of the pedal depression force by the vacuum booster 19 is exceeded.

The pressure apply check for checking or determining if the automatic pressure apply is normally calculated when the vehicle starts is carried out by the pressure apply check portion 77 based on the output signal of the stop lamp switch 67 and the master cylinder pressure Pmc detected by the fluid pressure sensor 62.

The pressure apply characteristic learning portion 78 performs a learning process which corrects the pressure control characteristic of the pressure apply unit 12 memorized in advance from the control current value I to the linear valve 31 and the master cylinder pressure Pmc obtained during the pressure apply check by the pressure apply check portion 77 or the end of the checking. The fluid pressure control apparatus 17 is controlled by the anti-skid control portion 79 for controlling the braking force applied to each wheel in order to prevent the locking of the wheels during braking, and the pressure apply unit 12 and the fluid pressure control apparatus 17 are controlled by the traction control portion 80 for applying a braking force to the driving wheels to prevent slip of the driving wheels during driving.

Figure 3:
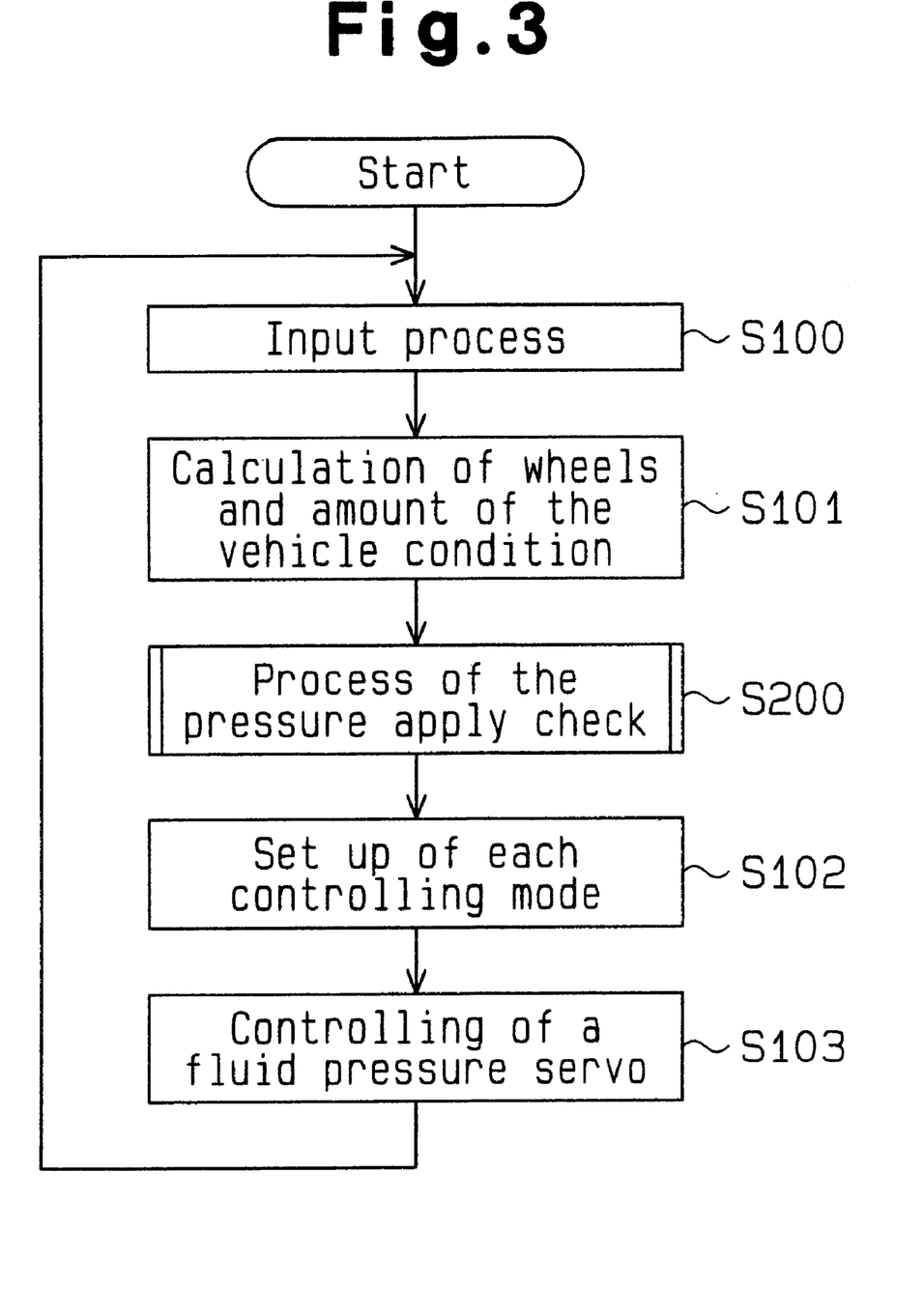
FIG. 3 is a flow chart illustrating the main routine associated with the operation of the braking control apparatus of the present invention.

The operating procedure performed by the ECU and the operation of the vehicle braking control apparatus according to the present invention is explained hereinafter with reference to FIG. 3. The routine shown in the flowchart of FIG. 3 starts when the engine operation is initiated upon turning on the ignition switch of the vehicle. At this time, any necessary initial set up is carried out. In step S100, an input process is performed involving reading the detected signals outputted by the fluid pressure sensor 62, the stop lamp switch 67, the wheel speed sensor 63, 64, 65, 66, the steering angle sensor 81, the vehicle acceleration sensor 82, and the yaw rate sensor 83. In addition, the master cylinder pressure changing speed (rate) dPmc is calculated based on the following formula (1)

$$dPmc = Pmc' - Pmc \quad (1)$$

wherein, Pmc' represents the present calculated value for the master cylinder pressure and Pmc represents the previous calculated value for the master cylinder pressure. The cycle time of the program calculation (cycle time of the FIG. 3 routine) is very short and can thus be considered as a constant, and so the master cylinder pressure changing speed can be determined by the change in pressure Pmc. The master cylinder pressure changing speed can thus also be referred to as a master cylinder pressure changing rate.

Next, in step S101, the wheel speed of each wheel, the wheel acceleration, the estimated vehicle speed at the gravitational center position of the vehicle and at each wheel position, and the actual slip ratio of each wheel are computed.

The routine then proceeds to step S200 at which the pressure apply check process, described below in more detail, is performed. Then, in step S102, various control modes such as the anti-skid control are set up and a target slip ratios for the various control modes are set up.

Then, in a step S103, the pressure apply unit 12 and the fluid pressure control apparatus 17 are properly controlled in response to the control modes, and the braking force applied to each wheel is controlled. After carrying out step S103, the routine returns to step S100.

Figure 4:
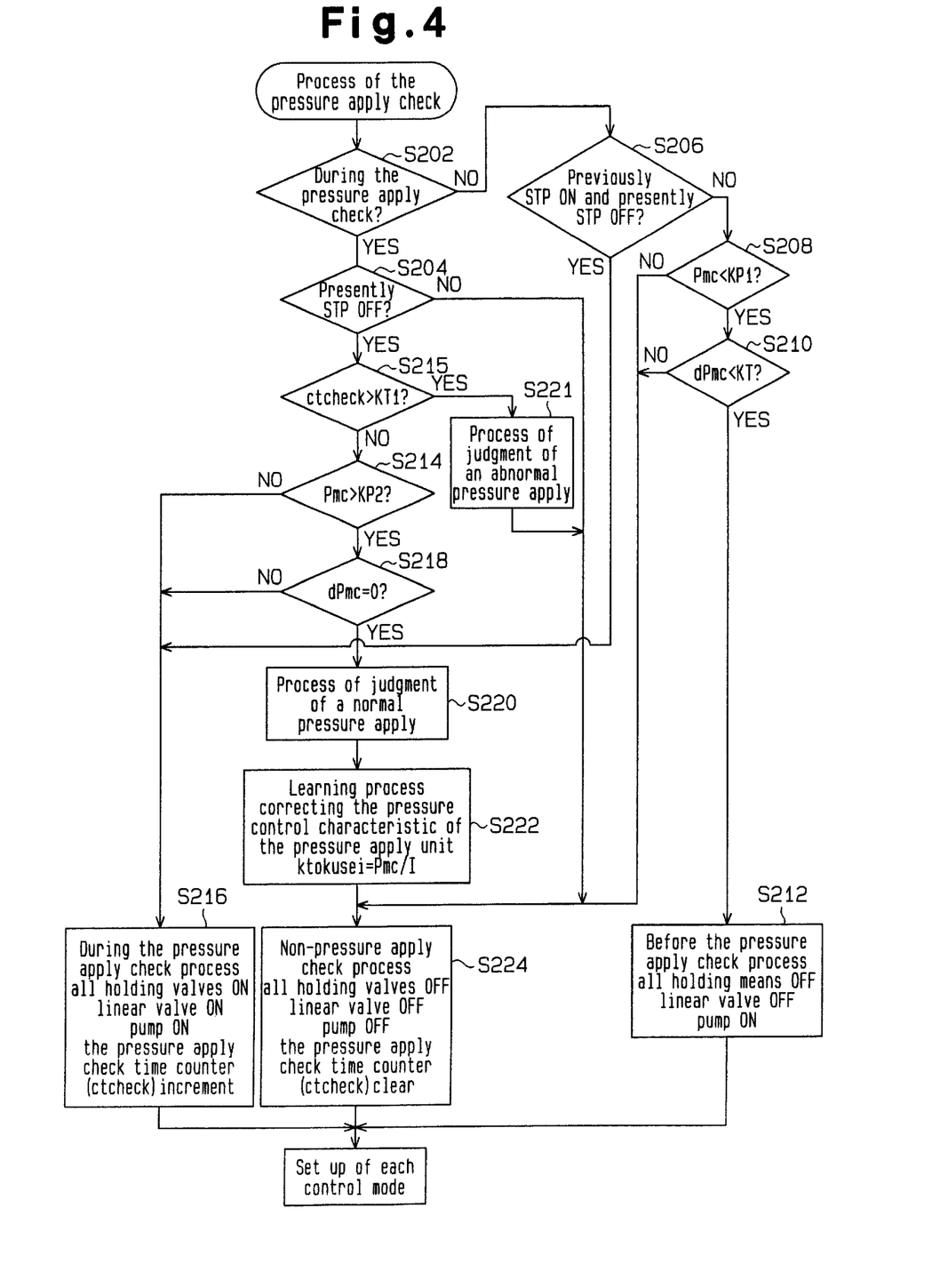
FIG. 4 is a flow chart illustrating a subroutine associated with the pressure apply check carried out in the main routine shown in FIG. 3.

The routine for the pressure apply check process of step S200 is carried out in accordance with the subroutine shown in FIG. 4. In step S202, it is determined whether or not the pressure apply check process is being performed. In the event the pressure apply check is being performed, the program proceeds to step S204. If the pressure apply check is not being performed, step S206 is carried out. If the ignition switch has just been turned on (i.e., the engine has just been started), the program proceeds to step S206 because the pressure apply check is not being processed.

In step S206, the system determines whether the stop lamp switch 67 is turned on during the previously calculated time and is turned off during the presently calculated time. If the determination in step S206 is YES, the program proceeds to step S216. On the other hand, if the determination in step S206 is NO, the program proceeds to step S208. If the brake pedal is maintained in a depressed state after the ignition switch is turned on, the program proceeds to step S208 from step S206 because the stop lamp switch 67 is on.

In step S208, a determination is made regarding whether the master cylinder pressure Pmc is less than a first fixed value KP1. If the master cylinder pressure Pmc is less than the first fixed value KP1, the routine advances to step S210, and if the master cylinder pressure Pmc is equal to or greater than the first fixed value KP1 the program advances to S224. Under the condition that the brake pedal 21 is depressed immediately after the ignition switch is turned on, the program proceeds to step S224 because the master cylinder pressure is more than the fixed value KP1, and while under the condition immediately before the brake pedal 21 is released, the program proceeds to step S210 because the master cylinder pressure is less than the fixed value KP1. The master cylinder pressure is less than the fixed value KP1 immediately before the brake pedal 21 is released because the brake pedal depressing force becomes small enough for the master cylinder pressure to be less than the fixed value KP1 immediately before the brake pedal 21 is released.

In step S210, the system determines whether the master cylinder pressure changing speed dPmc calculated in step S100 is less than a negative fixed value KT. If the master cylinder pressure changing speed dPmc is less than the negative fixed value KT, the routine proceeds to step S212. On the other hand, if the master cylinder pressure changing speed dPmc calculated in the step S100 is equal to or greater than the negative fixed value KT, the program advances to step S224. Immediately before the brake pedal is released, the master cylinder pressure changing speed dPmc is less than the negative fixed value KT and so the program advances to step S212.

In step S212, a pressure apply check pre-process is performed. During this operation, the holding valves 33a, 34a, 35a, 36a of all four wheels are off, the control current of the linear valve 31 is off and only the pump 29 is driven by the motor 30. In this way, if the master cylinder pressure Pmc is less than the first fixed value KP1 and the master cylinder changing speed dPmc is less than the fixed value KT before the stop lamp switch changes to off from on, the pressurization of the master cylinder pressure is started in advance by driving the pump 29. The reason is to shorten the time needed to increase the master cylinder pressure up to the second fixed value KP2 as a criterion of the normal judgment of the pressure apply check.

Afterward, the program proceeds back to step S200 and then moves to step S202. At this time, because the pressure apply check has not been started, the program moves to step S206. If the driver releases his/her foot from the brake pedal so that the stop lamp switch 67 is off, the process moves to step S216 from step S206 and the pressure apply check process is started.

In the pressure apply check process, the holding valves 33a, 34a, 35a, 36a of all of four wheels are on. Accordingly, the brake fluid pressure of the wheel cylinders 13, 14, 15, 16 of all four wheels is maintained to be constant. Simultaneously, the control current starts to be outputted to the linear valve 31 (the linear valve 31 is on). The pump 29 which is already being driven by the motor 30 (step S212) is further maintained to be driven. Additionally, the incrementing of the time counter (ctcheck) during pressure apply check is started.

The program then returns to step S202 by way of step S200. Because the pressure apply check process has been already started, the program proceeds to step S204 from step S202. In step S204, the system judges whether or not the stop lamp switch 67 is presently off. If the stop lamp switch is off, the program moves to step S214. If the stop lamp switch is on, the program moves to step S224 and the pressure apply check process is ended.

Immediately after the beginning of the pressure apply check, the program advances to step S215 from step S204 because the stop lamp switch 67 is off. In step S215, it is determined whether or not the pressure apply check time counter (ctcheck) exceeds a fixed time KT1. If the automatic pressure apply is judged abnormal because of a failure of the pressure apply unit 12 (i.e., the pressure apply check time counter (ctcheck) exceeds the fixed time KT1), the routine moves to step S221 and a pressure apply abnormal judging operation is carried out. In the pressure apply abnormal judging process, a warning light (not shown) informing the driver of the abnormal pressure apply is turned on and the setting up of the various control modes in the step S102 is prohibited.

If the master cylinder pressure Pmc is less than the second fixed value KP2 in step S214, the program moves to step S216. On the other hand, if the master cylinder pressure Pmc is greater than the second fixed value KP2, the routine advances to step S218. Immediately after the beginning of the pressure apply check, the program advances to step S216 because the master cylinder pressure Pmc is less than the second fixed value KP2 and the pressure apply check process is to be continued.

If the master cylinder pressure Pmc is more than the second fixed value KP2 during the pressure apply check process, the program advances to step S218 from step S214 where it is judged whether or not the master cylinder pressure changing speed dPmc is zero. When the master cylinder pressure changing speed dPmc is increasing (i.e., the changing speed dPmc is not zero), the routine advances to step S216 and the pressure apply check is continued. When the master cylinder pressure changing speed dPmc becomes zero during the pressure apply check process, the routine moves to step S220 where it is judged that the automatic pressure apply of the master cylinder pressure Pmc of the pressure apply unit 12 is operating normally.

The program then advances to step S222 and the learning process correcting the pre-stored pressure control characteristic of the pressure apply unit 12 performed by the control current value I and the master cylinder pressure Pmc when the master cylinder pressure changing speed dPmc becomes zero. Namely, the pressure control characteristic coefficient (ktokusei) of the pressure apply unit 12 is calculated using the following formula (2) by the control current value I and the master cylinder pressure Pmc when the master cylinder pressure changing speed dPmc becomes zero.

$$ktokusei = Pmc/I \quad (2)$$

The program then proceeds to step S224, the pressure apply check process is ended and the non-pressure apply check process is performed. In this non-pressure apply check process, the holding valves 33a, 34a, 35a, 36a of all four wheels are off, the control current of the linear valve 31 is off and the driving of the pump 29 by the motor 30 is stopped. The control current of the linear valve 31 is reduced continuously to avoid fluid shooting noise. This phrase refers to the noise caused by the collision of parts of the fluid in the linear valve 31, which occurs when the control current of the linear valve 31 is immediately shut off to reduce the third chamber pressure P3 quickly. After this, the program returns to the main routine.

According to the present invention, because the pressure apply check is initiated when the vehicle is started, that is when the stop lamp switch is turned to off from on, the pressure apply check is practiced every time when the vehicle is started. In the pressure apply check portion 77, the automatic pressure apply is judged normal when the master cylinder pressure is increased up to the fixed value KP2, that is when the determination in step S214 is YES.

From the foregoing, it can be seen that the pressure apply check for assessing whether or not the automatic pressure apply is normal is performed every time the vehicle starts. As a result, a driver can check at all times if the automatic pressure apply is assured by the pressure apply unit 12 during driving. Additionally, a manufacturer can check the automatic pressure apply of the manufactured brake apparatus before performing an inspection such as brake failure inspection.

Also, because the brake fluid of the wheel cylinders 13, 14, 15, 16 of all the wheels is held in the holding condition, (the step S216) when the pressure apply check is started, the increase in the master cylinder pressure by the automatic pressure apply is not applied to the wheel cylinders and the pressure apply check can be practiced without disturbing the vehicle upon start.

According to the present invention, the driving of the pump 29 is started before the pressure apply check is started and so the time required to increase the master cylinder pressure up to the second fixed value KP2 is shortened. As a result, the time during which the driver experiences an undesirable feeling in the holding condition of all wheels is shortened.

If the stop lamp switch 67 is on (the determination in step S204 is NO) indicating depression of the brake pedal 21 during the pressure apply check, the program advances to step S224 and the pressure apply check is ended. As a result, if the brake pedal 21 is depressed by the driver for effecting deceleration when the pressure apply check is being performed, the pressure apply check is ended and the deceleration demand is performed.

By virtue of the learning process correcting of the pressure control characteristic coefficient (ktokusei) of the pressure apply unit 12 when the pressure apply check is ended, the automatic pressure apply control afterward is performed correctly using the pressure control characteristic after the correction.

Additionally, because the correction of the pressure control characteristic coefficient is based on a stable master cylinder pressure once the master cylinder pressure has been increased to a predetermined value and the master cylinder pressure changing speed becomes zero, and based on the control current value to the linear valve (i.e., step S222), the subsequent automatic pressure apply control afterward is carried out more correctly.

Since the control current outputted into the linear valve 31 is reduced continuously in step S224 when the pressure apply check is ended, the generation of fluid shooting noise can be prevented when the pressure apply check is ended.

Although the present invention has been described as including the features noted above, it is to be understood that variations can be incorporated into the invention. For example, the applicable pressure apply unit of this invention applies not only to the pressure apply unit 12 described above, but also to any other pressure apply units.

Also, although the learning process of step S222 is practiced when the pressure apply check is ended, the learning process can also be practiced during the pressure apply check. For instance, the learning process can be practiced when the master cylinder pressure is increased up to the fixed value or after the fixed time has passed since the starting of the pressure apply check.

As described above, the present invention involves a learning process correcting of the pressure control characteristic coefficient (ktokusei) of the pressure apply unit 12. However, an alternative would involve renewing an I-P map pre-stored in a ROM 72 showing the relationship between the control current I outputted to the linear valve 31 and the master cylinder pressure Pmc.

In addition, although the stop lamp switch 67 is used as a detecting means for detecting the brake pedal depression, other structures could be accepted as the detecting means. For instance, a pedal depression force sensor in the form of a depression sensor outputting an ON signal when the brake pedal 21 is moved could be employed as well as a distortion sensor outputting an ON signal when the pedal depression force equal to or greater than a fixed value is applied to the operating rod 22.

While the fluid pressure control apparatus 17 providing connection between the master cylinder 20 and the wheel cylinders 13, 14, 15, 16 of each wheel is arranged in the manner shown in FIG. 2, the fluid pressure control apparatus 17 could include an X-piping arrangement.

In place of the vacuum booster 19, the pedal depression force could be amplified by a fluid pressure servo mechanism such as discussed in the background portion above. In such a case, the apparatus could be structured so that the fluid pressure generated in the pressure apply unit 12 in response to the amount of the condition of the vehicle is introduced and the booster piston is pushed by the fluid pressure in the booster chamber of the fluid pressure servo mechanism.

It is also possible to utilize a master cylinder having one piston in place of the master cylinder 20 having the tandem arrangement.

The present invention is advantageous in that the pressure apply check for assessing whether or not the automatic pressure apply is normal is carried out every time the vehicle starts. Also, the increasing of the master cylinder pressure by the automatic pressure apply during the pressure apply check is not applied to the wheel cylinders and so the pressure apply check can be performed without disturbing the vehicle start. Additionally, because it is possible to shorten the time required for the master cylinder pressure to reach the fixed value, the time period during which the undesirable driver feeling associated with the holding condition of all of the wheels is shortened.

With the present invention, if the brake pedal is depressed by the deceleration demand of the driver, the pressure apply check is ended and the deceleration demand is carried out. Also, the correction of the pressure control characteristic is performed from the stable master cylinder pressure when the master cylinder pressure is increased and the changing speed becomes zero and the control current value to the linear valve, the automatic pressure apply control performed afterward is more correct. Further, it is possible with the present invention to reduce or prevent the generation of fluid shooting noise when the pressure apply check is ended.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A braking control apparatus for a vehicle that includes an engine, a brake pedal and wheels, comprising;

fluid pressure generating means for generating a brake fluid pressure in response to a brake pedal depression force;

fluid supplying means for supplying the brake fluid pressure from the fluid pressure generating means to wheel cylinders associated with the wheels to apply a braking force;

pressure apply means for introducing fluid pressure to a pressure chamber of the fluid pressure generating means; and control means for automatically increasing the brake fluid pressure by controlling the pressure apply means and for controlling the braking force of each wheel by controlling a driving operation of the fluid supplying means;

the control means including pressure apply check means for starting a pressure apply check when the vehicle is started to determine whether the automatic pressure increase of the brake fluid pressure is properly performed;

the pressure apply check means determining the automatic pressure increase is properly made when the master cylinder pressure is increased to a predetermined value within a predetermined time after the pressure apply check is started.

2. The braking control apparatus for a vehicle as defined in claim 1, further comprising:

a brake pedal depression force detecting means outputting a first signal when the brake pedal is depressed and outputting a second signal when the brake pedal is released;

the pressure apply check means starts the pressure apply check when the second signal is outputted after an initial first signal has been outputted following starting of the engine; and the pressure apply check means holds the brake fluid pressure of the wheel cylinders of each wheel by maintaining the fluid supply means at a holding condition and starting automatic pressure increase operation by controlling the pressure apply means at the start of the pressure apply check.

3. The braking control apparatus for a vehicle as defined in claim 2, wherein:

the pressure apply means includes a pump supplying the brake fluid pressure to the pressure chamber, a motor driving the pump, and a linear valve generating a servo pressure in response to a control current outputted by the control means; and the pressure apply check means starts the driving of the pump by the motor after the initial first signal is outputted and before an initial second signal is outputted after the engine is started.

4. The braking control apparatus for a vehicle as defined in claim 2, wherein the pressure apply check means ends the pressure apply check when the first signal is outputted during the pressure apply check.

5. The braking control apparatus for a vehicle as defined in claim 3, wherein the pressure apply check means ends the pressure apply check when a changing speed of the master cylinder pressure becomes zero during the pressure apply check, and including executing a learning process correction of a pre-stored pressure modulating characteristic of the pressure apply means based on the control current value to the linear valve and the master cylinder pressure.

6. The braking control apparatus for a vehicle as defined in claim 3, wherein the pressure apply check means controls the pressure apply means to gradually decrease the control current outputted to the linear valve when the pressure apply check is ended.

7. A braking control apparatus for a vehicle that includes an engine, a brake pedal and wheels, comprising;
   a master cylinder generating a brake fluid pressure in response to a brake pedal depression force, the master cylinder including a pressure chamber connected to at least one wheel cylinder associated with one of the wheels;
   a fluid pressure sensor detecting a master cylinder pressure in the pressure chamber;
   a pressure apply unit performing pressure apply by introducing fluid pressure to the pressure chamber of the master cylinder;
   a controller automatically increasing the brake fluid pressure by controlling the pressure apply unit; and
   pressure apply check means for starting a pressure apply check when the vehicle is started to determine whether the pressure apply is abnormal, the pressure apply check means determining the pressure apply is abnormal when the master cylinder pressure determined by the fluid pressure sensor fails to reach a predetermined value within a predetermined time.

8. The braking control apparatus for a vehicle as defined in claim 7, including a brake pedal depression detector for outputting a first signal when the brake pedal is depressed and outputting a second signal when the brake pedal is released, the pressure apply check means starting the pressure apply check when the second signal is outputted after an initial first signal has been outputted following starting of the engine.

9. The braking control apparatus for a vehicle as defined in claim 8, wherein the pressure apply means includes a pump supplying the brake fluid pressure to the pressure chamber, a motor driving the pump, and a linear valve generating a servo pressure in response to a control current outputted by the control means, the pressure apply check means starting the driving of the pump by the motor after the initial first signal is outputted and before an initial second signal is outputted after the engine is started.

10. The braking control apparatus for a vehicle as defined in claim 8, wherein the pressure apply check means ends the pressure apply check when the first signal is outputted during the pressure apply check.

11. The braking control apparatus for a vehicle as defined in claim 7, wherein the pressure apply check means ends the pressure apply check when the changing speed of the master cylinder pressure becomes zero during the pressure apply check.

12. The braking control apparatus for a vehicle as defined in claim 11, wherein the pressure apply check means controls the pressure apply means to gradually decrease the control current outputted to the linear valve when the pressure apply check is ended.

13. The braking control apparatus for a vehicle as defined in claim 7, including executing a learning process correction of a pre-stored pressure modulating characteristic of the pressure apply means based on the control current value to the linear valve and the master cylinder pressure.

14. A method for determining proper automatic pressure increase in a braking control apparatus for a vehicle that includes an engine, a brake pedal, wheels, a master cylinder that generates a master cylinder pressure in response to depression of the brake pedal, and a pressure apply unit for introducing fluid pressure into a pressure chamber of the master cylinder to effect automatic pressure increase, the method comprising:
   initiating pressure apply check upon starting the vehicle to determine that the automatic pressure increase is proper;
   measuring the master cylinder pressure after initiation of the pressure apply check; and
   determining that the automatic pressure increase is proper when the master cylinder pressure has reached a predetermined value within a predetermined time after initiation of the pressure apply check.

15. The method as defined in claim 14, wherein the pressure apply check is initiated when the brake pedal is released after the brake pedal is first depressed following starting of the vehicle.

16. The method as defined in claim 14, wherein the pressure apply unit includes a pump supplying the brake fluid pressure to the pressure chamber, a motor driving the pump, and a linear valve generating a servo pressure, and including initiating driving operation of the pump after the brake pedal is first depressed after starting the vehicle and before the brake pedal is released.

17. The method as defined in claim 14, wherein the pressure apply check is stopped when the brake pedal is depressed during the pressure apply check.

18. The method as defined in claim 14, including ending the pressure apply check when a changing speed of the master cylinder pressure becomes zero during the pressure apply check.

* * * * *